UNITED STATES PATENT OFFICE.

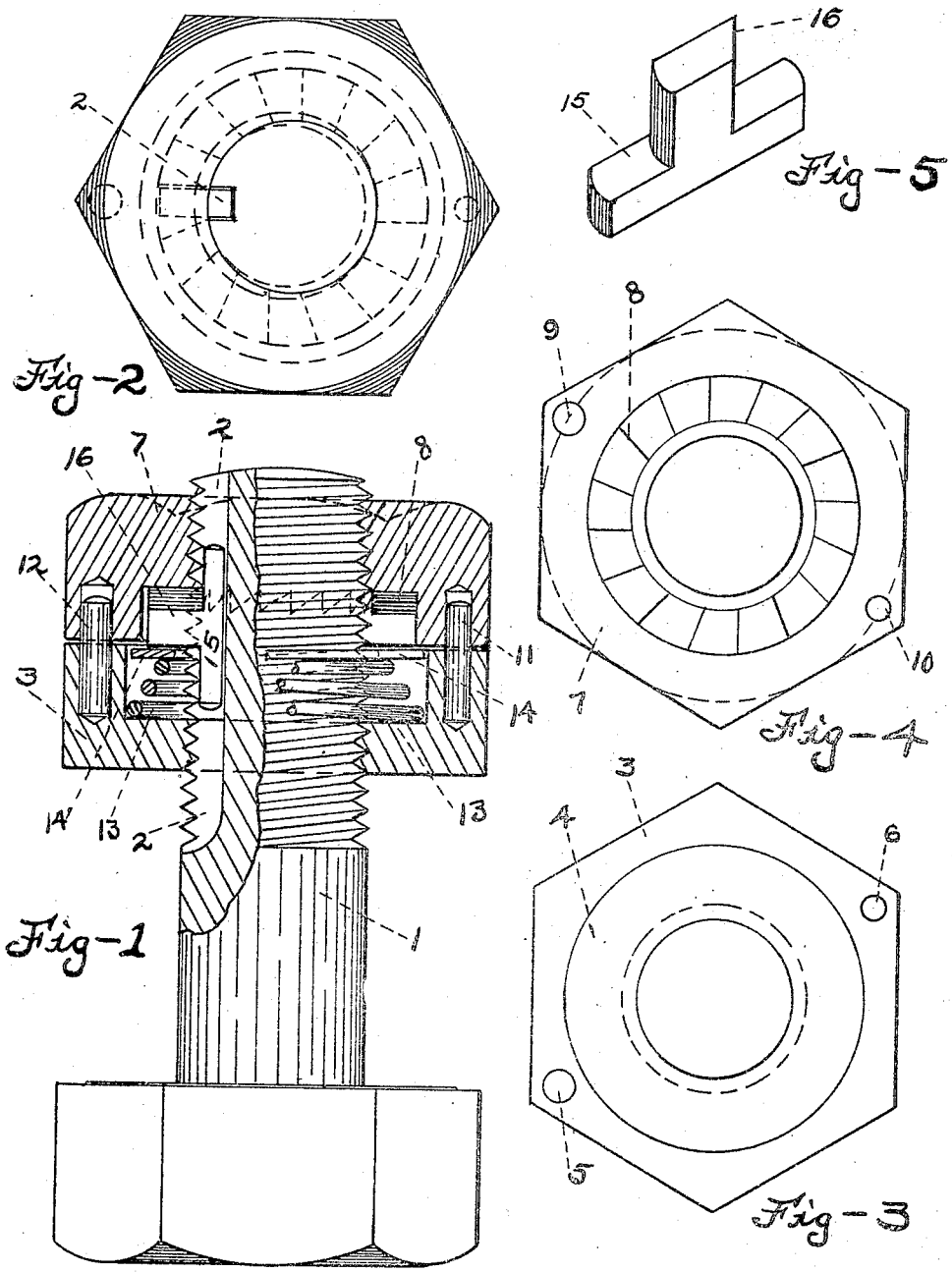
F. KRONBERG.
NUT LOCK.
APPLICATION FILED NOV. 29, 1920.
1,377,696.
Patented May 10, 1921.
INVENTOR
FRANK KRONBERG
BY
J. L. Rivers,
ATTORNEY

FRANK KRONBERG, OF SEATTLE, WASHINGTON.

NUT-LOCK.

1,377,696.  Specification of Letters Patent.  Patented May 10, 1921.

Application filed November 29, 1920. Serial No. 426,952.

*To all whom it may concern:*

Be it known that I, FRANK KRONBERG, a citizen of the United States, residing at Seattle, in the county of King and State of Washington, have invented a new and useful Nut-Lock, of which the following is a specification.

My invention, relating as it does to improvements in nut-locks, has for its objects the provision of a device for effectually locking a nut on a bolt or the like, and one that can be readily removed therefrom, the application or removal of which will cause no mutilation to the nut, the locking mechanism, or the object to which they are applied.

In the accompanying drawings—

Figure 1 is a sectional view of a bolt and a nut secured thereon in accordance with my invention, for the purposes of better illustration, the bolt being partly broken away; Fig. 2 is a top view of same, partly in plan; Fig. 3 is a view of the nut proper; Fig. 4 illustrates a complementary nut which coacts with said first nut; Fig. 5 is a perspective of a pawl which operates within a groove in said bolt and recesses in the nuts.

The bolt 1 is provided on its threaded portion with a groove 2 extending to its free end. The nut proper, designated as 3 has a circular outlined recess 4, and a pair of bores 5 and 6. The nut 7, Fig. 4, is provided with a similar recess, slightly smaller in diameter and having on its back wall as shown at 8, circumferentially extending ratchet teeth. 9 and 10 designate a pair of bores complementary to the two small bores in the nut 4. These bores are adapted to carry the pins 11 and 12 shown in Fig. 1 and are for the purpose of holding the two nuts together. In the style of construction shown one pin and the bores within which it is located are larger in diameter than the oppositely located pin and bores. This is to insure that the two nuts will be properly placed in position and that their threads will be in perfect alinement. It is obvious that other expedients can be utilized for achieving the same result. Located within the nut proper and around the bolt as shown in Fig. 1 is a spiral spring 13. Loosely mounted on the spring is the washer 14, having a central opening for the bolt and a diameter but slightly less than the diameter of the recess in said nut. A pawl is illustrated in Fig. 5, its body being designated as 15 and the pawl proper as 16. The body of the pawl slidably engages the groove in the bolt as illustrated in Fig. 1. The shoulder, carrying the pawl 16, contacts with the washer 14, the spring 13 giving the requisite tension to the pawl which operates in the teeth 8.

The device is operated by first placing the nut 4 on the bolt to the extent only that the threads of the bolt are still below the upper surface of the nut. The spiral spring 13 and the washer 14 are respectively placed over the end of the threaded section of the bolt and lodged in the recess of the nut, the nut now carrying the pins 11 and 12. The pawl member 15, having been located in the groove as shown in Fig. 1, the nut 7 is then adjusted to the two pins, the two nuts placed together, and the whole mechanism can then be threaded to operative position. It is obvious that in threading the lock on to the bolt the pawl will permit its advance by slipping over the ratchet teeth, but will prevent its return. Should it be desired to release the lock from the nut it can be easily accomplished by inserting a wire or other suitable instrument in the groove 2 at the free end of the bolt, and by pressing back the body of the pawl, the pawl itself will be released from the ratchet, when the lock can be removed.

I claim:

1. A device of the class described, comprising in combination with a bolt having a longitudinal channel along its threaded portion and terminating at the end thereof, a nut provided with a circular outlined recess, located within the recess a spiral spring surmounted by a washer each having a circular opening to admit the bolt, said washer being of a diameter but slightly smaller than the diameter of said recess, a pawl slidably located in said channel and coacting with the washer and spring, a complementary nut having a circular outlined recess of a diameter smaller than the recess in the first nut and having interiorly thereof ratchet teeth circumferentially located and adapted to coöperate with said pawl, means whereby said nuts may be placed and held together in operative position.

2. A device of the class described, comprising in combination with a bolt having a longitudinal groove terminating at its threaded end, a nut provided with an annular recess, located within the recess a washer adapted to encircle the bolt, means for giving tension to the washer, a pawl slidably located in said channel and subjected to tension by the washer, a jam-nut having an annular recess of a diameter smaller than said washer, with circumferentially arranged downwardly extending teeth adapted to coact with said pawl, means for locating and holding said nuts in juxtaposition.

FRANK KRONBERG.